United States Patent [19]

Castleman et al.

[11] 4,450,409
[45] May 22, 1984

[54] PRESSURE SENSOR AND LEAK DETECTOR

[75] Inventors: B. Wayne Castleman, Kenneth City; Robert F. Donehoo, Clearwater; Rudolph G. Oswald, Seminole; Kenneth L. Reed, Safety Harbor; George H. Shipley, Seminole, all of Fla.

[73] Assignee: Honeywell Inc., Minneapolis, Minn.

[21] Appl. No.: 310,183

[22] Filed: Oct. 9, 1981

[51] Int. Cl.³ .................. G01N 27/62; G01T 1/185
[52] U.S. Cl. ................... 324/460; 73/49.2; 250/384
[58] Field of Search ............... 250/384, 382; 324/460, 324/461, 464; 73/49.3

[56] References Cited

U.S. PATENT DOCUMENTS 3,223,842 12/1965 Hyde .................................. 250/384
3,310,734 3/1967 Hansen .............................. 324/460
3,495,165 2/1970 Cobine et al. ..................... 324/460
4,025,794 5/1977 Lovelock ...................... 250/384 X

FOREIGN PATENT DOCUMENTS 2034964 6/1980 United Kingdom ............... 324/461

Primary Examiner—Daniel M. Yasich
Attorney, Agent, or Firm—George W. Field

[57] ABSTRACT

A leak detector comprising a housing having an axis on first and second compartments spaced along the axis and hermetically separated by a partition, the first compartment being closed to comprise a pressure envelope which is in communication with an evacuated space to be monitored for leakage, an ionization cell in the first compartment providing an electrical current determined by gas in that compartment, hermetically sealed feed-through for enabling an electrical connection with the gauge, to the partition from the second compartment, an apparatus in the second compartment performing a control function in accordance with the current supplied by the cell.

1 Claim, 7 Drawing Figures

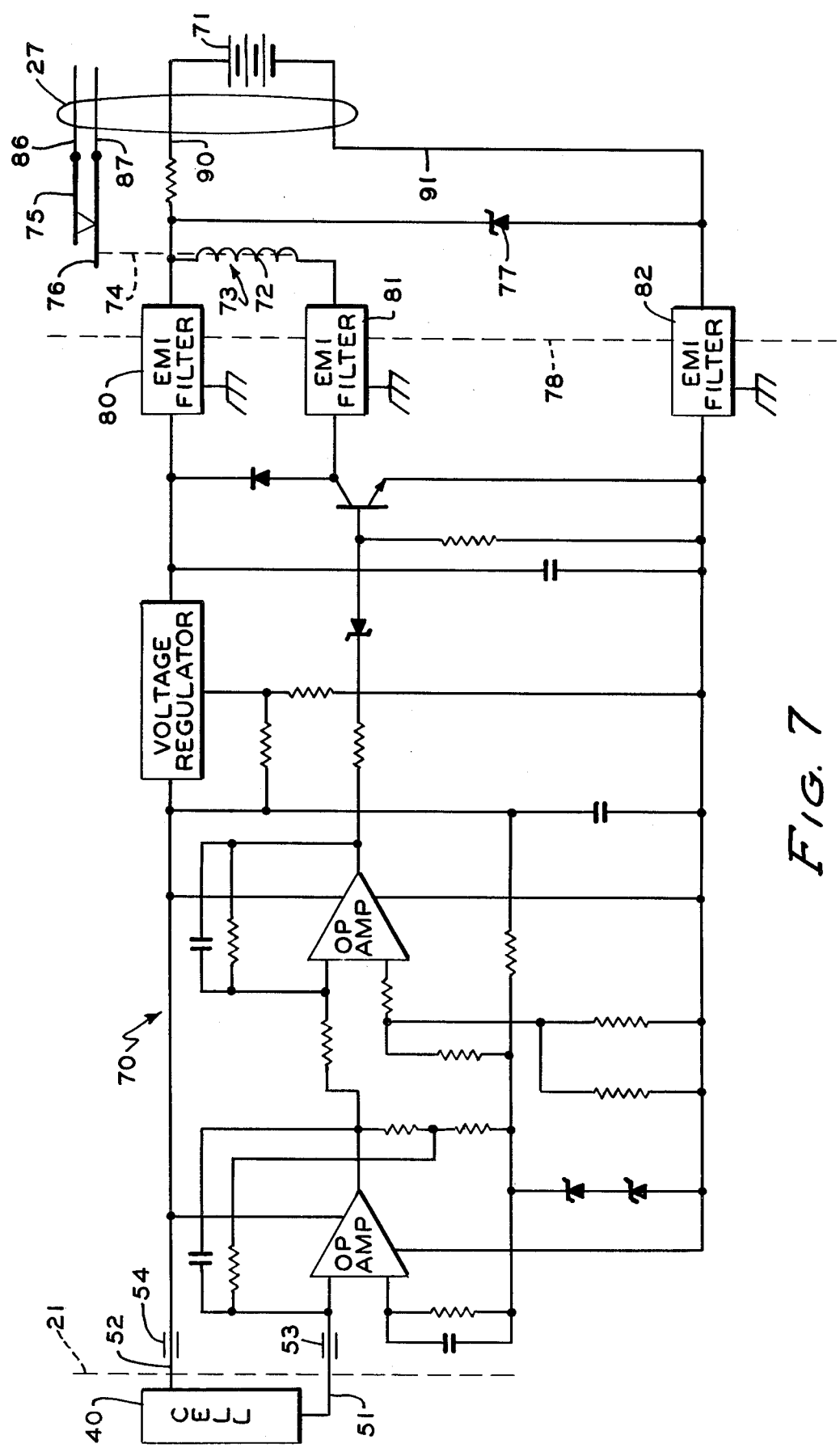

PRESSURE SENSOR AND LEAK DETECTOR

TECHNICAL FIELD

This invention relates to the field of logistics, and specifically to means for monitoring storage equipment to give a response if the equipment should develop a leak.

BACKGROUND OF THE INVENTION

In rocketry it is necessary to store the fuel for the rocket during a stand-by condition of the rocket. As an example, a rocket may have two storage tanks, for liquid fuel and liquid oxidant respectively, in which the liquid is contained within a bladder within the tank. The space (ullage) between the tank wall and the bladder is under a vacuum, so that its pressure may be approximately 100 microns. The stand-by condition may continue for ten years or more, and it is necessary to monitor the integrity of the ullage to be sure that no air leaks from outside the tank into the space, and that no liquid leaks from within the bladder into the space. If the pressure sensed in the space becomes greater than a selected value, say 100 microns, the sensor must give an alarm to a monitor circuit.

When the rocket is made operative, the liquid is forced to the engine from the tank by pressurizing the ullage up to 315 PSIA. While the instrument is no longer required to operate, it must nevertheless survive being pressurized to 350 PSI without exploding or fracturing, to release the fuel-feeding pressure or to damage the tank or other near-by equipment.

The needs of the application are such as to dictate structure either of stainless steel or of aluminum, and the structure must be an all welded design with a low leakage rate on the order of $1 \times 10^{-8}$ standard cubic centimeters per second at 100 PSI helium differential.

BRIEF SUMMARY OF THE INVENTION

The invention comprises a pressure sensor and leak detector compatible with rocket fuels and oxidants, having great sensitivity, great strength, and great reliability: it comprises an ionization cell open to the space being monitored, and electronically connected to a relay for performing the necessary alarm functions, the whole being hermetically assembled for long trouble free life without servicing.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

FIG. 7 is a wiring diagram.

DESCRIPTION OF THE PREFERRED EMBODIMENT

Figure 1:
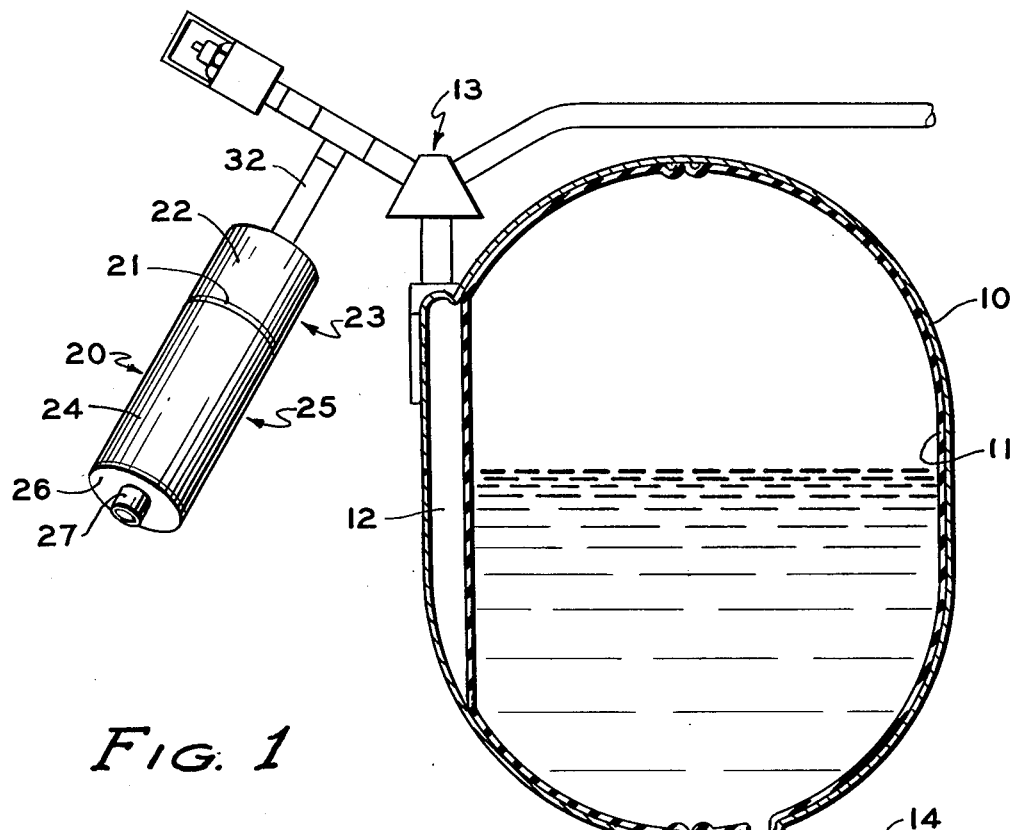
FIG. 1 is a somewhat schematic view of a leak detecting instrument according to the invention in its intended use.

As shown in FIG. 1 a metallic tank 10 for liquid propellant contains a bladder 11 in which the propellant is stored. The ullage between the bladder and the tank is shown at 12: it is normally evacuated, and is connected to conduit means 13 for supplying compressed air to the bladder to force the propellant to an engine, not shown, through a conduit 14. Connected to conduit means 13 is a leak detector according to the invention, comprising a housing 20 divided into two compartments by a bulkhead or partition 21 to which there are seal-welded a first shell 22 for a detector compartment 23 and a second shell 24 for an electronics compartment 25. Compartment 25 is closed by an end plate 26 carrying a multiple contact electrical connector 27. Compartment 23 is closed by an end plate 30 having a sensing port 31 affording communication with the otherwise hermetically sealed detector compartment, and a tube 32 is provided for mounting the instrument in communication through conduit means 13 with space 12 of which the pressure is to be monitored. Housing 20 is a circular cylinder on an axis 33, with compartments 23 and 25 on opposite sides of partition 21 and opening away from it.

Figure 5:
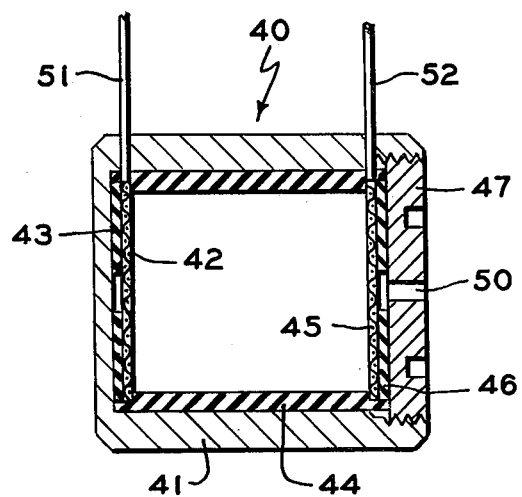
FIG. 5 is a showing of an ionization cell to a larger scale.

Compartment 23 contains an ionization cell 40, better shown in FIG. 5 to comprise a metallic casing 41 containing at one end a source 42 of charged particles. Tritium H3, may be used as such a source, and generates beta particles, but americium, Am241, is preferred because of its much longer half-life. Americium is a source of alpha particles and is available as Americium oxide contained in a gold matrix, which is chemically inert and for example can be cleaned with water, isopropyl alcohol, and many other solvents. Source 42 is insulated from casing 41 by a flat spacer 43 and a tubular spacer 44 stepped at one end to receive source 42 and spacer 43, and at the other end to receive a collector screen 45 and a second insulating spacer 46, the whole being maintained in assembled relationship by a retainer 47 having an aperture 50 to enable communication with the space within the housing. Electrical connection is made to source 42 and screen 45 by insulated conductors 51 and 52 passing through the casing 41.

Figure 6:
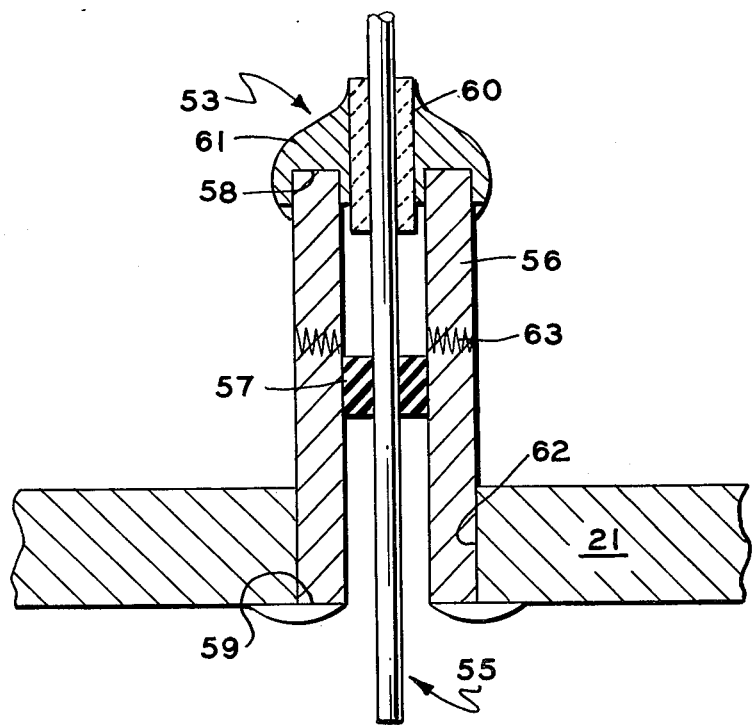
FIG. 6 shows a feed-through in longitudinal section.

Electrical connection is made through partition 21 to conductors 51 and 52 through electrical feed-throughs 53 and 54. As shown in FIG. 6, such a feed-through comprises a central, solderable conductor 55 spaced from a metallic tube 56 by an insulator 57 and sealed to one end 58 of tube 56 as follows: a ceramic layer 60 is sealed to conductor 55, and layer 60 is sealed to tube 56 by welded metal 61. Tube 56 is welded at its other end 59 to partition 21 at an aperture 62 for conductor 55.

As available commercially, tube 56 and metal 61 are of stainless steel which gives a more lasting seal to ceramic layer 60 when temperature variations are to be anticipated. This arrangement is satisfactory as long as partition 21 and the parts welded thereto are all of stainless steel. When it is desired to use aluminum instead of stainless steel, because of its lesser weight, the weld of the tube to the partition is a source of difficulty since the coefficients of expansion of the two metals are widely different. In the present invention this difficulty is avoided by making the first end 58 of tube 56 out of stainless steel, the second end 59 out of aluminum, and bonding the two ends together by a solid state diffusion joint suggested as 63 in FIG. 6.

The electrical design for the instrument comprises a straight-forward approach to converting an ion current into a proportional voltage, detecting a threshold level, and opening a contact to perform a control function, such as interrupting an alarm circuit. For completeness a schematic of circuitry adapted for this purpose is shown in FIG. 7, cell 40 being connected by electronics 70 to energize from a source 71 the winding 72 of a relay 73 so that its armature 74 opens the circuit between contacts 75 and 76. Relay 73 is contained, with a transient suppressor 77, in an electromagnetic interference shield can 78 in compartment 25, through which connections are made by electromagnetic interference filters 80, 81, and 82.

Figure 2:
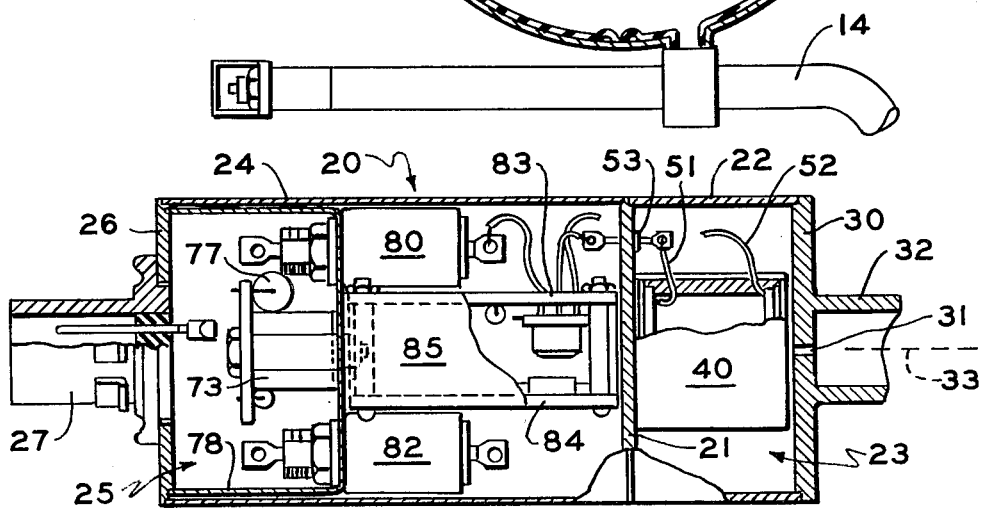
FIG. 2 is a view of the instrument in axial section.
Figure 3:
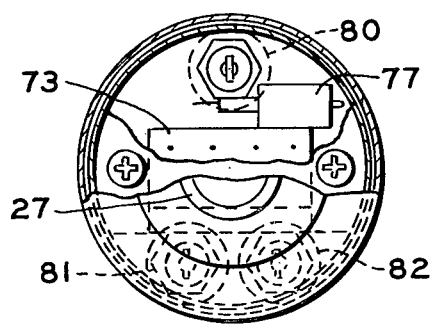
FIG. 3 is an end view of the instrument seen from the left in FIG. 2, parts being broken away for clarity of illustration.
Figure 4:
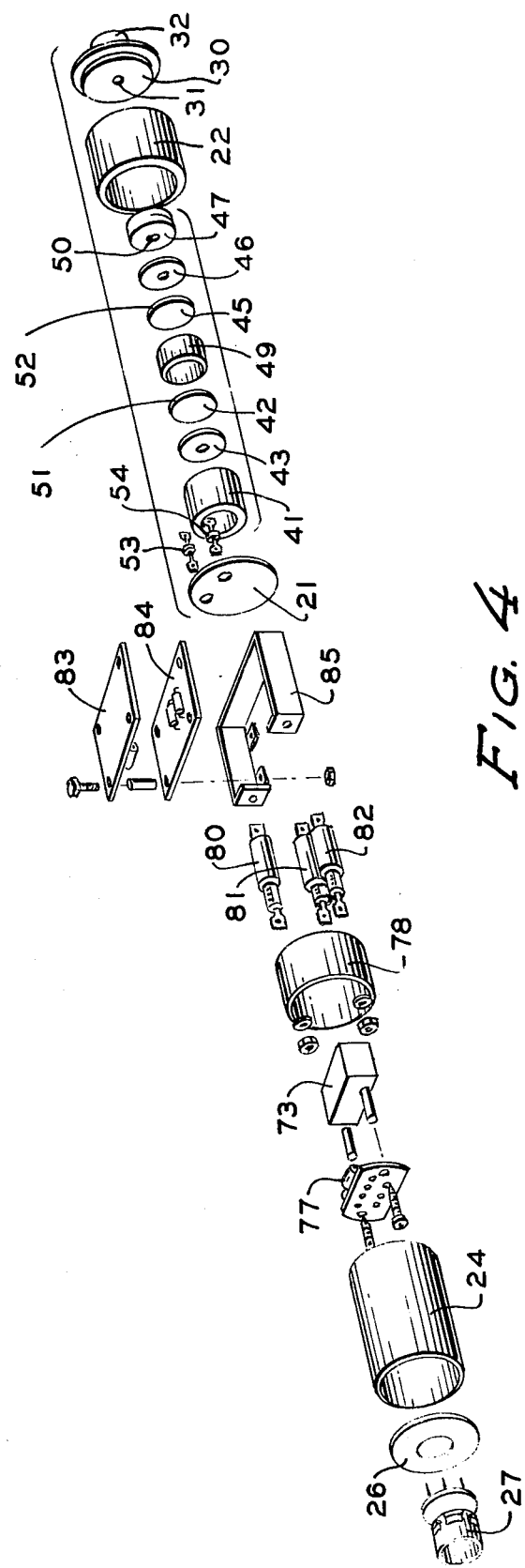
FIG. 4 is an exploded view of the instrument.

As is best shown in FIG. 2, most of the electronic components are mounted on a pair of circuit boards, 83, 84, carried in a circuit board frame 85 welded to partition 21 at one end and supporting can 78 and relay 73 at the other end. The relay contact wires 86, 87 and the battery wires 90 and 91 are brought out through connector 27.

OPERATION

As long as ullage 12 is at the intended low pressure, only a few molecules of air are in the chamber of ionization cell 40 and the particles emitted by source 42 do not cause enough ionization in the chamber to produce an ionization current sufficient to act through electronics 70 and energize relay 73. However, if air leaks into the ullage from without the tank, or if propellant leaks into the ullage from within the bladder, air or propellant molecules diffuse into cell 40, the particles emitted by source 42 causes ionization of the air or propellant molecules, and the resulting increased ionization current is converted by electronics 70 to a voltage which actuates relay 73 to give the required alarm.

From the foregoing it will be evident that the invention comprises an instrument using an ionization cell to monitor the ullage of a propellant tank, whereby to give accurate, reliable indication of leakage while withstanding high pressures incident to use of the rocket. The structure makes use of an improved feed-through having parts of aluminum and stainless steel connected by a solid state diffusion joint.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

We claim:
1. A leak detector comprising, in combination:
a housing having an axis and first and second compartments spaced along said axis and hermetically separated by a partition;
means for placing said first compartment in communication with an evacuated space to be monitored for leakage;
an ionization cell in said first compartment producing an electric current determined by gas in said first compartment;
means in said second compartment for performing a control function in accordance with the current supplied by said cell, including a cup shaped shield spaced from and opening away from said partition, a relay mounted in said shield, and feed-through filtering means having first ends extending through the bottom of said cup shield and second ends within said compartment beyond said shield;
and hermetically sealed feed-through means for making electrical connection with said cell through said partition into said second compartment, said partition being of aluminum and said hermetically sealed feed-through means comprising a solderable conductor, a metallic tube surrounding and insulated from said conductor and having a first end portion of stainless steel, a second end portion of aluminum, a solid state diffusion bond joining said end portions, means sealing said first end of said tube to said conductor including a ceramic layer sealed to said conductor and a stainless steel portion sealed to said ceramic layer and welded to said first end portion of said tube, and means welding said second end portion of said tube to said partition to surround an aperture for traversal by said conductor.

* * * * *